(12) United States Patent
Ehlers et al.

(10) Patent No.: US 6,560,397 B1
(45) Date of Patent: May 6, 2003

(54) OPTICAL SYSTEM FOR VARYING THE BEAM WIDTH USING NON-IMAGING OPTICS

(75) Inventors: Bodo Ehlers, Plymouth, MI (US); Stefan Wolfgang Heinemann, Ann Arbor, MI (US)

(73) Assignee: Fraunhofer, USA, Plymouth, MI (US)

( * ) Notice: Subject to any disclaimer, the term of this patent is extended or adjusted under 35 U.S.C. 154(b) by 0 days.

(21) Appl. No.: 09/699,698

(22) Filed: Oct. 30, 2000

(51) Int. Cl.[7] ............... G02B 6/10; F21V 7/14
(52) U.S. Cl. ........................ 385/146; 385/133
(58) Field of Search ................ 385/146, 133, 385/140, 147; 359/495, 129, 127; 372/15

(56) References Cited

U.S. PATENT DOCUMENTS

| | | | |
|---|---|---|---|
| 5,005,935 A | * | 4/1991 | Kunikane .............. 359/129 |
| 5,303,084 A | * | 4/1994 | Pflibsen ................ 359/503 |
| 5,307,430 A | | 4/1994 | Beach et al. ............ 385/31 |
| 5,422,758 A | * | 6/1995 | Lawson ................. 372/20 |
| 5,583,683 A | * | 12/1996 | Scobey ................. 359/127 |
| 5,743,901 A | | 4/1998 | Grove et al. ........... 606/9 |
| 6,002,829 A | * | 12/1999 | Winston et al. ........ 385/146 |
| 6,115,178 A | * | 9/2000 | Naganuma et al. .... 359/495 |

* cited by examiner

Primary Examiner—Georgia Epps
Assistant Examiner—Omar Hindi
(74) Attorney, Agent, or Firm—Young & Basile P.C.

(57) ABSTRACT

An apparatus for adjusting the width of a coherent or partially coherent beam of light comprising at least one pair of opposing reflectors each having an inwardly facing light reflecting surface, the reflectors being pivotally mounted with respect to said optical axis and means for adjusting the angle of said pivotally mounted reflector with respect to said optical axis.

15 Claims, 2 Drawing Sheets

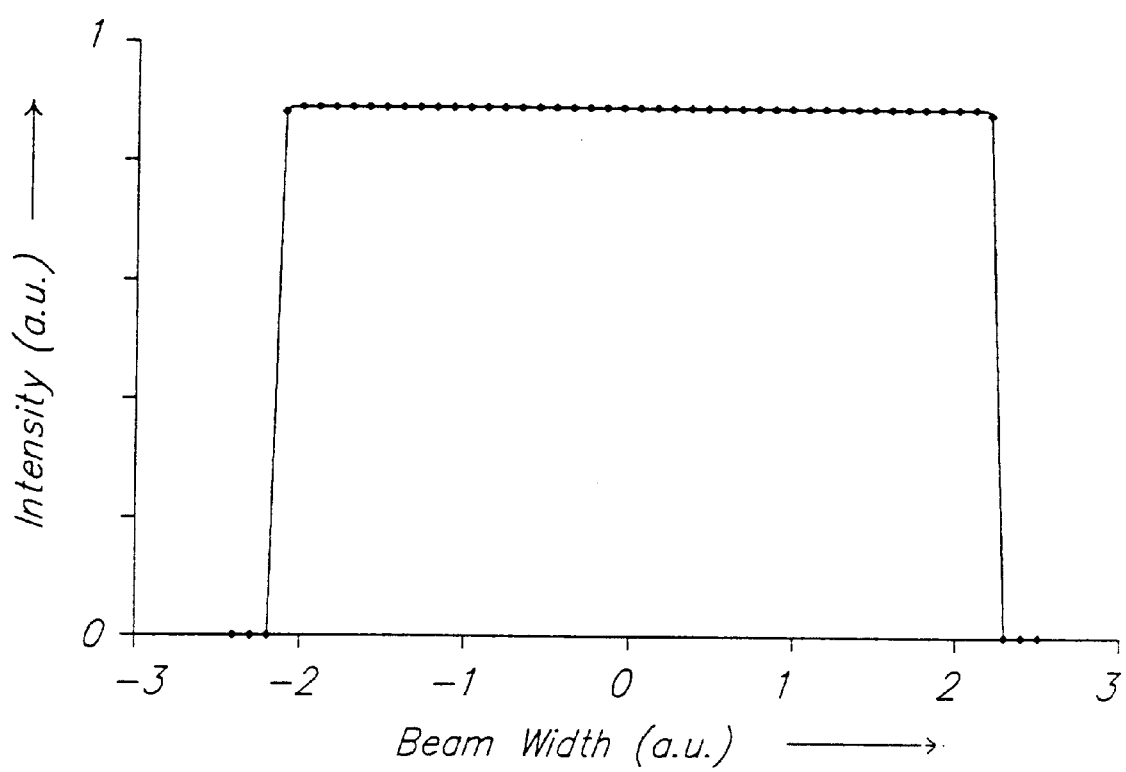
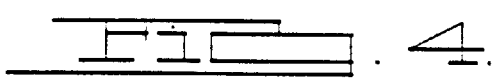

OPTICAL SYSTEM FOR VARYING THE BEAM WIDTH USING NON-IMAGING OPTICS

BACKGROUND OF THE INVENTION

1. Field of the Invention

Recently, high power diode laser stacks have been widely used for surface treatment. A certain proportion of these applications require a defined track width and a uniform intensity distribution across the beam. When using a fixed beam spot size, the track has to be processed by successive laser runs. The surface is scanned with the laser beam and one processed area is put next to the other. Scanning of a surface has some drawbacks with respect to the process performance in creating that surface since consecutive application of the beam leads to irregularities of the surface structure. Therefore, a laser source with adjustable beam width is desirable.

To vary the spot size of the laser beam without time-consuming disassembly or un-attachment to the given optics, a variable optical set-up has to be used. This can be achieved with a varifocal lens or a zoom lens. However, these systems exhibit disadvantages, as such lenses are costly, heavy, and bulky and can create blurred spot sizes. The latter is mainly due to the high divergence angle of the diode laser beams.

Secondly, some diode laser stacks may not emit a laser beam that provides the required uniformity of its intensity distribution. It may exhibit peaks and dents that reduce the quality of the process. Therefore, an optic is desirable that flattens and homogenizes the intensity distribution of the laser beam over its width.

To overcome these disadvantages, a system is disclosed which provides a variable spot size using positionally adjustable reflective optics.

2. Description of Related Art

A system using light funnels for end-pumping of solid state lasers has been disclosed by Lawrence Livermore National Laboratory by Raymond J. Beach et. al., U.S. Pat. No. 5,307,430. The LLNL system disclosed is not adjustable and relies on total internal reflection to guide the beam. It is not designed for direct material processing with diode lasers.

SUMMARY OF THE INVENTION

The claimed invention is used to process a beam emitted from a light source, e.g. a diode laser, CO2 laser or Nd: YAG laser. The set-up consists of two reflective planes, which generally face each other, but exhibit an angle to each other that can be adjusted. The planes can converge or be parallel to each other. The space between the two planes can contain either air or any other optically transparent medium. The reflecting surfaces are designed as mirrors with a coating (e.g. dielectric or metal) or can be formed by total internal reflection.

By adjusting the mirrors, the beam width and the divergence angle are changed at the end of the set-up. The beam is imaged to the screen by a standard imaging optic. The imaging optic has a constant focal length. The variation of the spot size is performed through the variation of the angles of the reflectors, and thus no moving lenses are necessary.

DESCRIPTION OF THE DRAWINGS

FIG. 4 shows the flattened intensity distribution at the end of the device for a specific set of parameter.

DETAILED DESCRIPTION OF THE EMBODIMENTS

Figure 1:
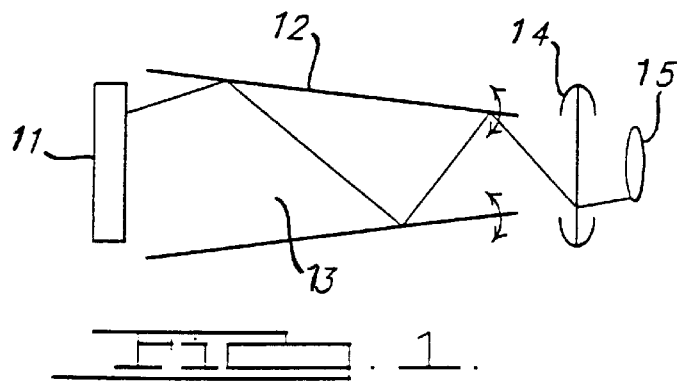
FIG. 1 shows an apparatus for a laser optic according to the current invention.
Figure 2:
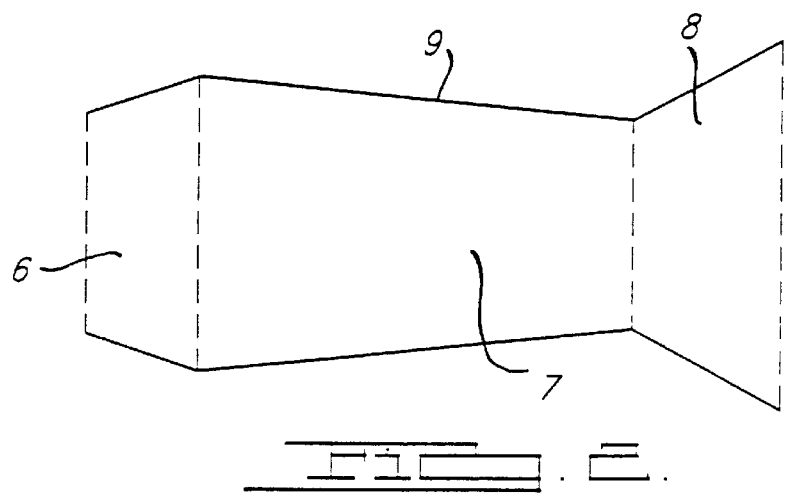
FIG. 2 shows the beam diameter and divergence angle of the light as the light passes through the disclosed system.

FIG. 1 illustrates an assembly for variable laser beam transformation for a material surface processing operation. A light source (11) radiates a beam of coherent or partially coherent light (laser) into an arrangement of reflector (12) panels having reflective surfaces (13). It should be appreciated that the reflective surface (13) is the critical element of the reflector (12), and that any shape or construction can be used for the reflector body (12) to facilitate adjustment. The reflective surfaces (13) are critical to the quality of the beam produced and thus are preferably of the most durable and reflective construction available. Mirrors with a coating, either dielectric or metal depending on the application, have been suitable reflective surfaces, as have reflectors with total internal reflection. The space (14) between the reflective surfaces (13) may be comprised of any medium that is transparent for the wavelength range of the light source, such as air, liquids, glass, etc. It is anticipated that for certain applications, an optically transparent medium with a higher refractive index than air will be preferred. Thus, an optically transparent solid such as optical-grade glass may be disposed between the reflectors still leaving an air gap in the middle of the device to provide room for the mirrors to pivot. Further, a fluid tight enclosure (not shown) can be used to enclose the reflectors and then be filled with an optically transparent liquid.

Depending upon the desired beam width, the reflectors (12) are adjusted as described below to insurrect at least a portion of the beam emitted from the light source (11). A portion of the beam is reflected between the reflective sources and the beam width is defined by the distance at the distal end (20) of the reflective surfaces. It should be appreciated that any number of opposing pairs of reflectors can be used to define the beam.

The length of the reflective surfaces along the optical axis when the surfaces are parallel to the optical axis defines the quantity of reflection of the portions of the beam for any given reflector angle. The values for the length and the angle of the mirrors are limited by the divergence angle of the exiting beam. The divergence angle of the exiting beam must be maintained below the acceptance angle of the subsequent imaging optic. Thus, longer mirror lengths restrict the possible angle range to smaller values. Reflector width need only be wider than the beam exiting the light source (11). The light beam exits the arrangement of reflective surfaces (12) into an imaging system (14) and is collected on the screen (15).

The diameter of the beam (6) before the disclosure will be narrowed down (7) is determined by converging reflecting surfaces (9). Upon exit of the disclosed system, the beam has a smaller diameter and a higher divergence angle (8).

The apparatus pivotally mounting and positioning the reflective surfaces (12) is well known in the art and not shown. It is preferred that the pivotally adjusting mechanisms be electrically controlled step motors, so that the reflective surfaces (12) can be remotely programmed to adjust to specific angles and the adjustments are highly accurate and repeatable. It is also contemplated that the adjusting mechanism could include an infinitely variable electrical motor. Utilizing these types of available control systems, the user can select a beam width at the control console, ana a computer processor (readily available) would calculate the preferred angles for the reflective surfaces (12), and generate the appropriate electronic signal to cause the electric motors to adjust the angles of the reflective surfaces (12).

The imaging system can be a variety of apparatuses, from a relatively simple lens array to a fiber optic delivery system. The screen (15) can be any intended surface, such as the target surface to be treated. The present invention would also have utility in scanning or detection systems where the defined width beam is passed over a surface and either reflected to a sensor or interrupted by the surface from reaching a sensor. Thus, surface defects or apertures can be precisely located, detected or measured.

Figure 3:
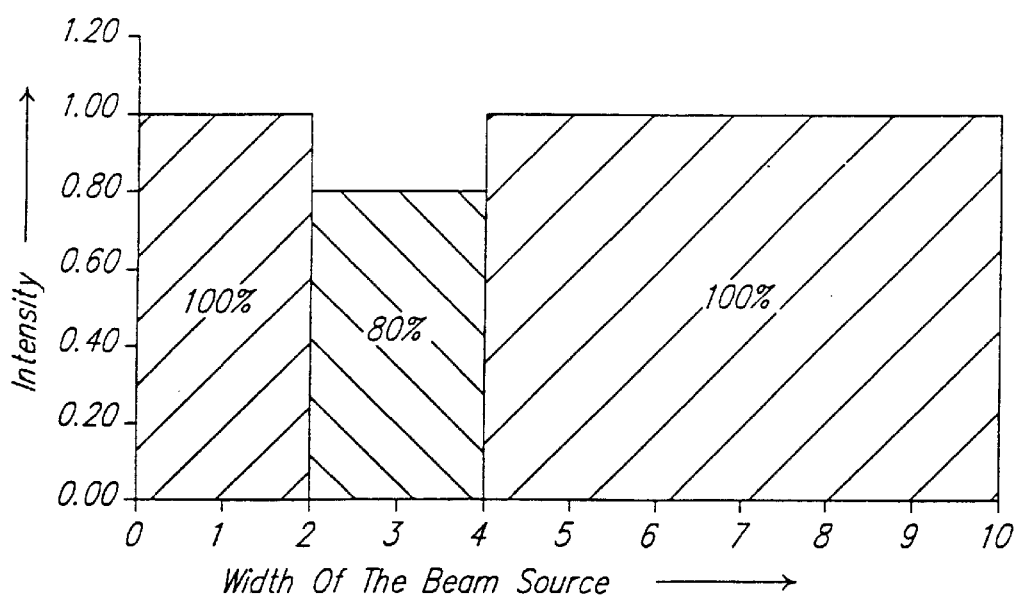
FIG. 3 shows an inhomogeneous intensity distribution that is coupled into the device.

FIG. 3 shows an arbitrary, non-uniform intensity distribution that is coupled into the disclosed device. FIG. 4 illustrates the intensity distribution of the beam at the output of the device with correctly chosen parameters for pivot angles and mirror length.

What is claimed is:

1. An apparatus for adjusting the width of a coherent or partially coherent beam of light defining an optical axis comprising:

at least one pair of opposing reflectors each having an inwardly facing light reflecting surface, said surfaces disposed about said optical axis, and each of said reflectors having a separate pivotal axis for pivotally mounting said reflectors with respect to said optical axis; and means for independently adjusting the angle of each of said pivotally mounted reflectors about said pivotal axis with respect to said optical axis.

2. A system as recited in claim 1 wherein said reflecting surfaces are comprised of dielectrically coated surfaces.

3. A system as recited in claim 1 wherein said reflecting surfaces are comprised of metal coated surfaces.

4. A system as recited in claim 1 wherein said reflecting surfaces are comprised of interfaces between an optically dense and an optically thin medium.

5. An apparatus for adjusting the width of a coherent or partially coherent beam of light defining an optical axis comprising:

at least one pair of opposing reflectors each having an inwardly facing light reflecting surface, said surfaces disposed about said optical axis, and at least one of said reflectors being pivotally mounted with respect to said optical axis; and means for adjusting the angle of said pivotally mounted reflector with respect to said optical axis wherein each of said panels is pivotally mounted and said adjusting means adjusts each of said panels to position each said reflective surface at the same angle with respect to said optical axis.

6. The apparatus of claim 1 wherein each of said reflectors is pivotally mounted and said adjusting means adjusts each of said reflectors independently with respect to said optical axis.

7. An apparatus for adjusting the width of a coherent or partially coherent beam of light defining an optical axis comprising:

at least one pair of opposing reflectors each having an inwardly facing light reflecting surface, said surfaces disposed about said optical axis, and at least one of said reflectors being pivotally mounted with respect to said optical axis; and means for adjusting the angel of said pivotally mounted reflector with respect to said optical axis; and a fluid tight enclosure enclosing said reflectors.

8. A system as recited in claim 7 wherein said enclosure contains an optically transparent liquid.

9. A system as recited in claim 1, further comprising an optically transparent solid medium between the reflecting surfaces.

10. An apparatus for adjusting the width of a coherent or partially coherent beam of light defining an optical axis comprising:

a pair of opposing, planar reflectors each having an inwardly facing light reflecting surface, said surfaces disposed about said optical axis, and each of said reflectors is independently adjustable and pivotally mounted about separate pivotal axis; and at least one motor for independently adjusting the angle of each of said pivotally mounted reflectors about said pivotal axis with respect to said optical axis.

11. The apparatus stated in claim 10, further comprising:

a transparent medium substantially perpendicular to said planar reflectors.

12. The apparatus stated in claim 10, further comprising:

said reflectors adapted to be a sufficient length to allow for multiple reflection of said light.

13. The apparatus stated in claim 10, further comprising:

said motor adjusting said reflectors at a substantially similar angle with respect to said optical axis.

14. A method for adjusting the width of a coherent or partially coherent beam of light defining an optical axis, comprising the steps of:

providing at least a pair of opposing reflectors each having an inwardly facing light reflecting surface wherein said surfaces are disposed about said optical axis;

mounting said reflectors about separate pivotal axes for pivotally mounting said reflectors relative to said optical axis;

is independently adjusting the angle of said reflectors about said pivotal axes with respect to said optical axis; and directing a beam of coherent or partially coherent light between said pair of opposing reflectors.

15. The method stated in claim 4, further comprising the steps of:

selecting a width of said beam of light;

calculating the angles of the reflectors to generate said selected width of said beam of light; and adjusting said reflectors to correspond to said calculated angles of said reflectors.

* * * * *

UNITED STATES PATENT AND TRADEMARK OFFICE
CERTIFICATE OF CORRECTION

PATENT NO. : 6,560,397 B1
DATED : May 6, 2003
INVENTOR(S) : Ehlers

It is certified that error appears in the above-identified patent and that said Letters Patent is hereby corrected as shown below:

Column 2,
Line 40, delete "(20)";

Column 3,
Line 4, delete "ana" and insert -- and --;
Line 5, after "(12)" please delete ",";

Column 4,
Line 5, delete "angel" and insert -- angle --;
Line 44, delete "is".

Signed and Sealed this

First Day of July, 2003

JAMES E. ROGAN
*Director of the United States Patent and Trademark Office*